Aug. 27, 1968   J. W. CARTER ET AL   3,399,378
SYSTEM FOR SIGNALLING BETWEEN EARTHMOVING VEHICLES
Filed March 31, 1965                    2 Sheets-Sheet 1
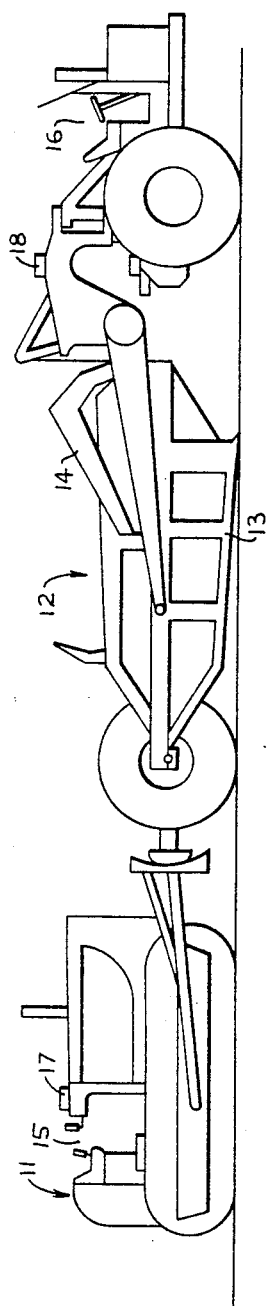
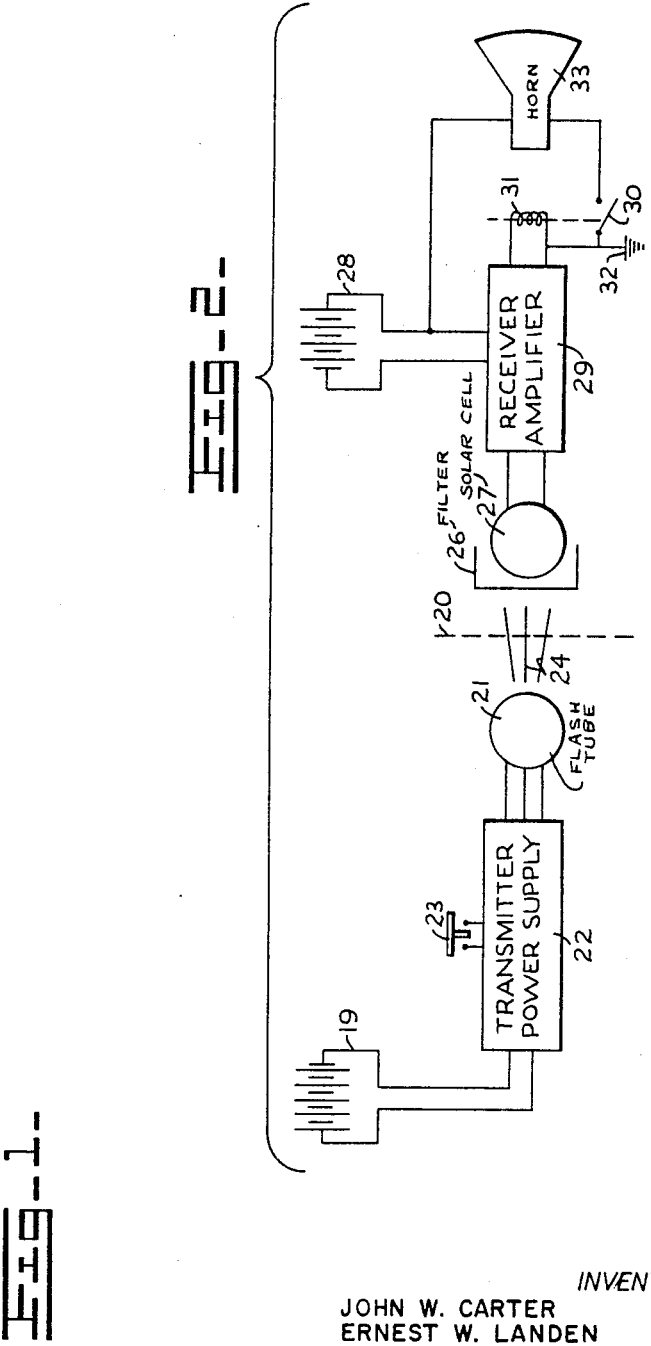
INVENTORS
JOHN W. CARTER
ERNEST W. LANDEN
ROBERT G. MILLER
CHARLES E. ANDERSON, DECEASED
BY ROBERT C. STRODEL, ADMINISTRATOR
ATTORNEYS

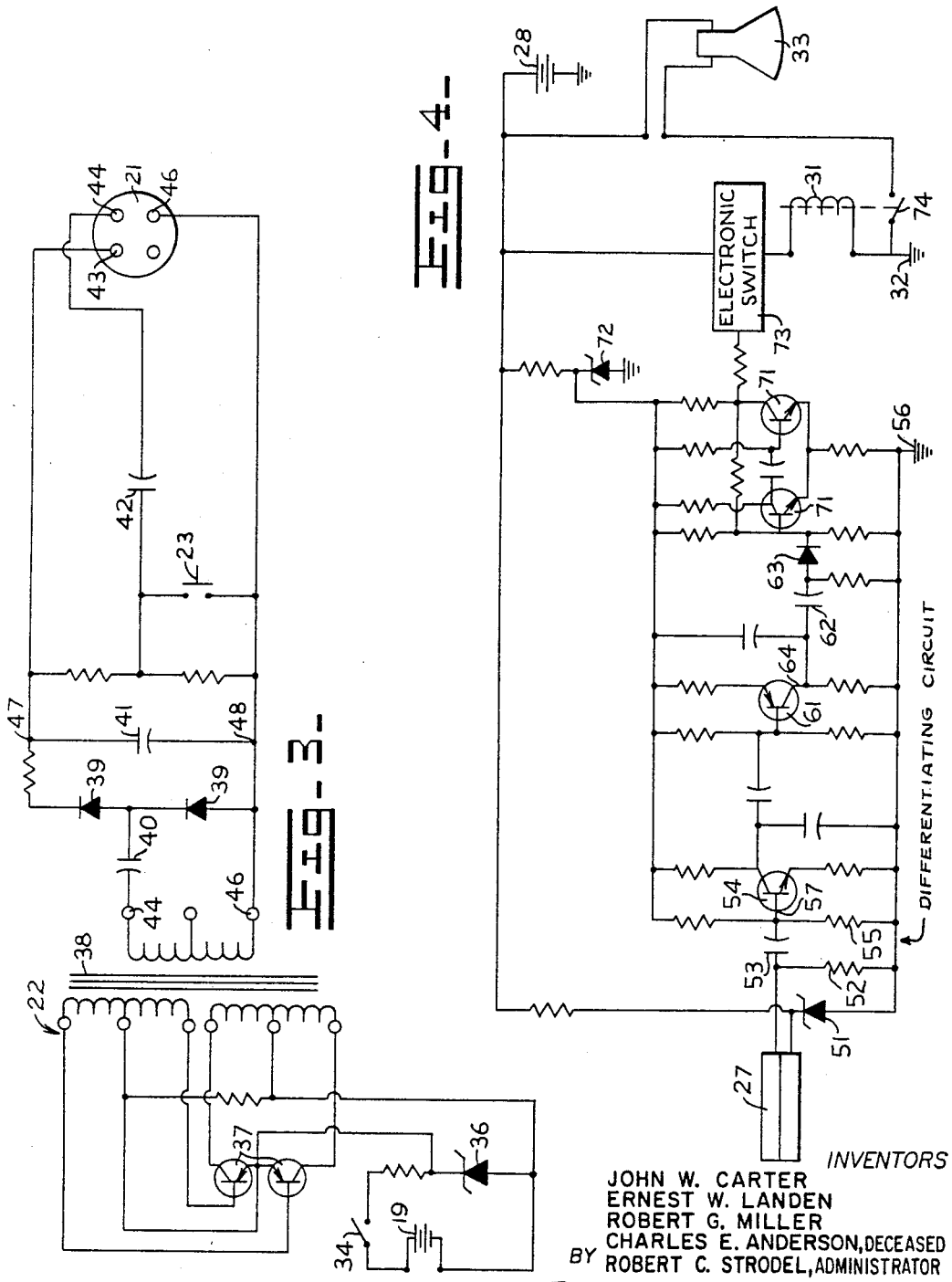

United States Patent Office 3,399,378
Patented Aug. 27, 1968

3,399,378
SYSTEM FOR SIGNALLING BETWEEN
EARTHMOVING VEHICLES
John W. Carter, Peoria, Ernest W. Landen, East Peoria, and Robert G. Miller, Princeville, Ill., and Charles E. Anderson, deceased, late of Marquette Heights, Ill., by Robert C. Strodel, administrator, Peoria, Ill., assignors to Caterpillar Tractor Co., Peoria, Ill., a corporation of California
Filed Mar. 31, 1965, Ser. No. 444,462
4 Claims. (Cl. 340—34)

ABSTRACT OF THE DISCLOSURE

A manually operable light transmitting device, including a flash tube which is operative to emit an abrupt flash of light characterized by an initial high level of intense illumination, is positioned on a pusher vehicle, and a receiving device, including a solar cell, the internal resistance of which varies inversely with the level of illumination received by it, disposed to receive any and all radiations including the above-described flash of lights, when emitted, and is positioned on the pushed vehicle. The receiving device also includes a differentiating circuit, the magnitude of the output from which varies directly with the rate of change of light received by the solar cell, and further includes an amplifier which is so biased that it will produce a load signal only when it receives from the differentiating circuit a signal having a magnitude which is the result of the solar cell's having received the above-described flash of light. Receipt by the horn of the load signal actuates the horn and alerts the operator of the pushed vehicle.

---

This invention relates to a signalling system between vehicles, and more particularly to a signalling system for use in earthmoving operations between a pusher tractor and a self-powered earth scraper vehicle which is customarily pushed by the tractor during the earth loading cycle.

In the constant struggle to upgrade the efficiency with which earth is moved by heavy earth conditioning vehicles, it has been learned that greater overall efficiency is achieved when a tractor is used to increase the motive force of a scraper by pushing the scraper during its loading cycle. In turn, this greater overall efficiency is further increased by the scraper leaving the earth loading area when it becomes fully loaded: not sooner and not later. If the scraper leaves before it is fully loaded, that cycle has not produced as much earth moving as possible.

Operators of earth scrapers are well aware of their visual handicap, particularly during the critical loading cycle, especially to determine the precise moment when the scraper bowl is filled to capacity. Those familiar with the mechanics of earth scrapers know that as the scraper bowl is being filled with earth, the elevatable scraper apron, which acts as a closure to the mouth of the bowl, is in an elevated condition. The operator of the scraper who is seated forward of the scraper bowl is visually handicapped by not being able to see the level of the earth in the bowl behind him because of this elevated condition of the scraper apron. Unable to determine the critical and fleeting point of time when the scraper bowl is filled to capacity, the scraper operator's potentially greater earth loading efficiency suffers. Scrapers often leave the earth loading area underfilled and often continue to scrape even when filled to capacity. Both conditions are equally detrimental to efficiency and economy of operation. The problem is to enable the scraper operator to determine when the bowl is just filled so that he may manipulate the appropriate mechanisms under his control in order to terminate the loading cycle. It is this problem to which the present invention is addressed and which is solved by the present invention.

Various attempts have been made in the past to solve this problem. Solutions are known whereby the operator of the pusher tractor, who has a significantly commanding view of the level of the earth in the scraper bowl ahead of him, manipulates controls on the pusher tractor which actuate the scraper apron without the intervention of the scraper operator.

It is preferable, however, for the scraper operator to have complete control over his vehicle including sole control of the termination of the loading cycle. The present invention offers a significantly economical and practicable solution to the problem.

Accordingly, it is an object of this invention to provide a one-way intervehicular signalling system whereby the operator of the pusher vehicle may signal the operator of the pushed vehicle, instantly and effectively.

It is another object of this invention to provide a signalling system, part of which is mounted on the pusher vehicle and part of which is mounted on the pushed vehicle, whereby the operator of the pusher vehicle may simply press a switch thereon without any loss of attention to his general control of the pusher vehicle, and whereby the operator of the pushed vehicle will be immediately warned or signalled in response thereto without any loss of attention to his general control of the pushed vehicle.

It is yet another object of this invention to provide a signalling system which will not interfere with local radio, television and other commercial communication networks.

It is yet another object of this invention to provide a signalling system which operates effectively independent of the weather or construction noise generally attendant earth conditioning operations.

It is yet another object of this invention to provide a signalling system that is both economical to install and operate and is also light and compact.

Other objects and advantages of this invention herein described and claimed will become readily apparent as the specification and drawing are being read.

Referring now to the drawing, in which:

FIG. 1 is a schematic diagram of a typical pusher track-type tractor pushing an earthmoving scraper;

FIG. 2 is a schematic diagram of the preferred embodiment of the signalling system which is the subject matter of the present invention;

FIG. 3 is a circuit diagram of that part of the signalling system carried by the pusher vehicle; and FIG. 4 is a circuit diagram of that part of the signalling system carried by the pusher vehicle.

Referring to FIG. 1, a self-powered track-type tractor 11 is shown disposed to push a self-powered earth scraper 12. Scraper 12 has a scraper bowl 13 and an elevatable scraper apron 14. As part of the loading operations, apron 14 is elevated and it is thus disposed between the scraper operator and the bowl 13. Under these circumstances the scraper operator is unable to see the extent to which the bowl has been filled.

Mounted on pusher tractor 11 is a housing 17 containing light transmitting means and associated circuitry to be described in detail hereafter; mounted on pushed scraper 12 is a housing 18 containing light receiving means and associated circuitry also to be described in detail below. Housings 17 and 18 are so mounted on their respective vehicles that a light signal emitted from housing 17 is received by the light receiving means in housing 18 when tractor 11 is disposed in pushing relationship with respect to scraper 12.

Referring now to FIG. 2, a source of electrical energy 19 such as the battery of tractor 11, is electrically disposed to energize light transmitting means or flash tube 21 through power supply 22. When pressed, switch 23, situated within easy reach of the tractor operator in operator's compartment 15 of the pusher tractor 11, causes a flash of light shown as rays 24 to be emitted from flash tube 21. Rays 24 initially strike filter 26, the function of which will be described below, and emerge from filter 26 to be received by light receiving means or solar cell 27. A source of electrical energy 28, such as the battery of scraper 12, is electrically disposed to energize receiver amplifier 29 which is in turn electrically disposed to energize relay 31 when amplifier 29 receives a uniquely characterized signal from solar cell 27. When energized, relay 31 closes switch 30 and completes an electrical circuit from battery 28 to ground 32 through signalling means or horn 33. Horn 33 is conveniently placed in scraper operator's compartment 16 so as to be audible by the scraper operator even when extremely noisy operating conditions prevail.

It is apparent that horn 33 may be replaced by various equivalent signalling devices such as, for example, a visible flashing light, the combination of a horn and flashing light, etc.

By employing a band of electromagnetic waves falling in the light spectrum to actuate the light receiving means, instead of a band characteristic of radio waves, the invention may be practiced without fear of interfering with local radio and television reception.

Referring now to FIG. 3 for a detailed description of power supply 22, flash tube 21 and other components of the signalling system shown on the left-hand side of dotted line 20 of FIG. 2, pusher tractor battery 19 is the primary source of electrical energy for the light transmitting means or flash tube 21. Favorable results have been obtained by using a commercial Kemlite DXR5 xenon flash tube and reflector (not shown). Power supply 22 can be switched on by the operator of the pusher tractor by means of switch 34. Switch 23 must also be closed, however, by the pusher tractor operator to trigger flash tube 21.

A constant regulated voltage across the Zener diode 36 is supplied to chopper transistors 37, the pulsating output from which is applied to the primary windings of transformer 38.

The secondary voltage output appearing between terminals 44, 46 of transformer 38 is applied to a conventional D.C. voltage doubling circuit consisting of capacitor 40 and diodes 39. From a typical regulated constant voltage of 10 volts D.C. across Zener diode 36, the above described circuitry provides a voltage of approximately 450 volts D.C. between terminals 47, 48 of the capacitive discharge circuit associated with flash tube 21. The capacitive discharge circuit consists of a relatively large capacitor 41 and a smaller capacitor 42 both of which are charged by the voltage across terminals 47, 48. When the operator of the pusher tractor wishes to signal the operator of the pushed scraper that the scraper bowl is filled to capacity, he closes discharge switch 23 thereby shorting the capacitive charge of capacitor 42 across starting terminals 44, 46 of flash tube 21. This discharge triggers the flash tube. The larger built-up capacitive charge of capacitor 41 which also appears across firing terminals 43, 46 of the flash tube, is allowed to discharge across terminals 43, 46 in view of the path between terminals 43, 46 completed by the ionized gas of the triggered tube. This discharge serves to produce a short-lived flash of light characterized by an initial high level of intense illumination. The term "high level" which has been used above to describe the flash of light is to be understood as meaning a level of illumination which is at least as high as the level of the brightest sunlight. Furthermore, it will also be understood that reference to the duration of the flash of light is a reference to the duration of the rise time thereof. While the use of a flash having a rise time in the order of one-twentieth of a milli-second has been found to produce satisfactory results, it is to be understood that other values can be employed depending on the parameters of the light receiving circuitry. Also, while the light receiving circuitry to be described is responsive to the abrupt change in the level of illumination during the rise time, from zero to maximum intensity of the flash, it is within the scope of the invention to employ an abrupt change in the level of illumination during the fall time from maximum to zero intensity. It is such a flash to which the signalling means on the pushed scraper is adapted to respond, for example, to cause horn 33 to emit a warning noise audible by the scraper operator.

Referring now to FIG. 4, for a detailed description of the light receiving means or solar cell 27, the discriminating means and amplification means all contained in housing 18 and other components of the signalling system shown on the right-hand side of dotted line 20 of FIG. 2, pushed scraper battery 28 is the primary source of electrical energy therefor. Light receiving means or solar cell 27 is connected in series with load resistor 52 and in turn are both connected in parallel with Zener diode 51 in the battery 28 to ground 56 circuit. The constant regulated voltage across Zener diode 51 is thus also the voltage that appears across the serially connected solar cell 27 and load resistor 52.

It is imperative that the signalling means or horn 33 be responsive only to the flash of light emitted from flash tube 21 and not responsive to sunlight or other light sources. To help achieve this, an infra-red light filter 26 (FIG. 2) may be used. It has been found that such a filter reduces the level of illumination of the sun to a greater extent than the level of illumination of the flash of light from the flash tube 21. The infra-red filter 26, of course, renders the solar cell sensitive only to the infra-red portion of the flash. To further insure that horn 33 is only responsive to the flash of light emitted from solar cell 27, the solar cell is biased, the proper degree of biasing being effected in the following way. With filter 26 removed and the solar cell 27 exposed only to bright sunlight, a value of load resistor 52 is selected which will limit the voltage drop across load resistor 52 to approximately sixty percent of the Zener voltage of Zener diode 51. The remaining approximately forty percent voltage drop will be across the internal resistance of solar cell 27 because of the above described serial connection. The internal resistance of a solar cell varies inversely with the level of the illumination received by it. It follows that the greater the level of illumination received by a solar cell, the greater will be the current induced in it. It becomes apparent from the above described series-parallel connection that the greater the level of illumination solar cell 27 receives, the greater will be the proportion of the total voltage drop to appear across load resistor 52, where the total voltage drop has a magnitude equal to the regulated voltage across the Zener diode 51.

The flash of light of initial high level of intense illumination which is received by solar cell 27 is also characteristically fast rising. Therefore, the rate of change of voltage across load resistor 52 will vary directly with the rate of change of the internal resistance of solar cell 27. To further insure that horn 33 will be only responsive to the flash of light emitted from flash tube 21, discriminating means, consisting of a differentiating circuit composed of capacitor 53 and resistor 55 are employed. The above described critical voltage across load resistor 52 provides the input to this differentiating circuit. The output from a differentiating circuit is directly proportional to the rate of change of its input. Consequently, neither extraneous light reflections nor the sudden drop in the background level of illumination from the sun will produce a rate of change of voltage across load resistor 52 sufficient to appreciably affect the differentiating network.

The output from the differentiating circuit is applied to base 57 of first transistor amplifier 54 which is slightly forward biased. The second transistor amplifier 61, resistance-capacitive coupled to first amplifier 54, is also slightly forward biased. One-shot multivibrator shown generally at 71, is capacitive coupled to the output from second amplifier 61 through capacitor 62 and clipping diode 63. Since both first and second transistor amplifiers 54 and 61 are slightly forward biased and remain in their quiescent state one-shot multivibrator 71 remains oblivious to any random fluctuations in the output from the differentiating circuit as applied to base 57 of first transistor amplifier 54. Such random fluctuations can, of course, be caused by a slow rate of change of voltage across load resistor 52 as may be associated with the sun's sudden disappearance behind a cloud.

Once solar cell 27 receives the peculiarly characterized flash of light emitted from flash tube 21, the rate of change of the voltage across load resistor 52 becomes sufficiently fast, the output from the differentiating circuit as seen by base 57 causes first and second transistor amplifiers 54 and 61 to operate above their quiescent state and the one-shot multivibrator 71, regulated by Zener diode 72, is triggered by the clipped output from collector 64 of second transistor amplifier 61.

Once one-shot multivibrator 71 is triggered, it produces a square wave pulse of a fixed time duration. This output square wave pulse may be amplified in a well-known manner and the amplified output therefrom is fed to electronic switch 73 which in turn energizes relay means 31 and closes switch 74. When switch 74 is closed, this completes the battery 28 to horn 33 to switch 74 to ground 32 circuit and causes the horn 33 to emit a warning noise or signal audible by the operator of the pushed scraper.

We claim:
1. In a system for signalling between a self-powered pusher vehicle and a self-powered earth conditioning vehicle wherein the pusher vehicle is disposed behind the earth conditioning vehicle to assist the earth conditioning vehicle by pushing it, the combination comprising:
    light transmitting means mounted on the pusher vehicle and operative to emit a discrete, abrupt flash of light which is repeatable at predetermined intervals and which is characterized by an initial high level of intense illumination;
    first electrical energizing means associated with said light transmitting means and manually operable to induce the emission of said discrete, abrupt flash of light from said light transmitting means;
    a solar cell, the internal resistance of which varies inversely with the level of illumination received by it, disposed at a location on the earth conditioning vehicle to receive spurious light and said discrete, abrupt flash of light when emitted from said light transmitting means, and responsive to the receipt thereof to produce an electrical output signal composed generally of a plurality of component signals each of a different rate of change of voltage;
    a first resistor serially connected to said solar cell;
    a source of regulated voltage connected in parallel with said solar cell and said first resistor;
    a differentiating circuit having an input and an output, the input connected in parallel with said first resistor, said differentiating circuit being operative to produce an output signal the magnitude of which varies directly with the rate of change of the input from said first resistor, said last-named output signal including a predetermined large magnitude signal only when said solar cell receives said discrete, abrupt flash of light;
    amplification means electrically associated with the output from said differentiating circuit and biased to produce a load signal only upon receipt of said predetermined large magnitude signal from the output from said differentiating circuit;
    signalling means electrically associated with said amplification means and responsive to said load signal to alert the operator of the earth conditioning vehicle.

2. The combination of claim 1 wherein said light transmitting means is a flash tube operable to emit a flash of light characterized by having a fast rise time.

3. The combination of claim 1 wherein said solar cell produces a maximum response to illumination in the infra-red spectral band.

4. The combination of claim 3 further comprising an infra-red filter disposed between said flash tube and said solar cell.

References Cited

UNITED STATES PATENTS

| 3,152,317 | 10/1964 | Mayer | 340—34 |
| 3,278,895 | 10/1966 | Pfund | 340—34 |
| 3,092,921 | 6/1963 | Forst | 340—33 |

FOREIGN PATENTS

| 157,021 | 6/1954 | Australia. |
| 161,550 | 3/1955 | Australia. |

THOMAS B. HABECKER, *Primary Examiner.*